US010445968B2

(12) United States Patent
Berthe et al.

(10) Patent No.: US 10,445,968 B2
(45) Date of Patent: Oct. 15, 2019

(54) METHOD FOR VERIFYING A SECURITY DEVICE COMPRISING A SIGNATURE

(71) Applicant: IDEMIA FRANCE, Colombes (FR)

(72) Inventors: Benoît Berthe, Colombes (FR); Coralie Vandroux, Colombes (FR); Yvonnic Morel, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 15/566,828

(22) PCT Filed: Apr. 15, 2016

(86) PCT No.: PCT/FR2016/050880

§ 371 (c)(1),
(2) Date: Oct. 16, 2017

(87) PCT Pub. No.: WO2016/166490

PCT Pub. Date: Oct. 20, 2016

(65) Prior Publication Data

US 2018/0122173 A1 May 3, 2018

(30) Foreign Application Priority Data

Apr. 17, 2015 (FR) ..................................... 15 53437

(51) Int. Cl.
*G06K 9/74* (2006.01)
*G07D 7/1205* (2016.01)
(Continued)

(52) U.S. Cl.
CPC ........... *G07D 7/1205* (2017.05); *G07D 7/003* (2017.05); *G07D 7/004* (2013.01); *G07D 7/205* (2013.01)

(58) Field of Classification Search
CPC ...... G07D 7/1205; G07D 7/003; G07D 7/004; G07D 7/205
(Continued)

(56) References Cited

U.S. PATENT DOCUMENTS 4,590,366 A * 5/1986 Rothfjell .......... G06K 19/06046 235/462.01
4,663,518 A * 5/1987 Borror .................. B41M 5/286 235/468
(Continued)

FOREIGN PATENT DOCUMENTS

FR 2974652 A3 11/2012
WO 01/60047 A2 8/2001
(Continued)

OTHER PUBLICATIONS

International Search Report dated Jun. 14, 2016, International Application No. PCT/FR2016/050880, pp. 1-4.

*Primary Examiner* — Roy M Punnoose
(74) *Attorney, Agent, or Firm* — MH2 Technology Law Group, LLP

(57) ABSTRACT

A method for verifying a security device including an image having a signature. The method may include operations for acquiring the image in order to obtain a first representation of the image, extracting the signature, and verifying the signature. Also included are implementations in the form of a verification apparatus, a computer program, and a computer data medium including such a computer program.

16 Claims, 2 Drawing Sheets

(51) Int. Cl.
*G07D 7/202* (2016.01)
*G07D 7/00* (2016.01)
*G07D 7/004* (2016.01)

(58) Field of Classification Search
USPC .............................................................. 356/71
See application file for complete search history.

(56) References Cited

U.S. PATENT DOCUMENTS

| | | | | | |
|---|---|---|---|---|---|
| 4,921,278 | A * | 5/1990 | Shiang | G06K 19/14 | 283/117 |
| 4,972,476 | A * | 11/1990 | Nathans | G06K 9/00268 | 283/77 |
| 5,027,401 | A * | 6/1991 | Soltesz | G06K 19/14 | 235/379 |
| 6,104,812 | A * | 8/2000 | Koltai | G06T 1/0021 | 283/113 |
| 6,122,403 | A * | 9/2000 | Rhoads | G06F 17/30876 | 382/233 |
| 7,427,030 | B2 * | 9/2008 | Jones | B41M 3/144 | 235/462.01 |
| 7,712,673 | B2 * | 5/2010 | Jones | G06K 19/08 | 235/380 |
| 8,543,823 | B2 * | 9/2013 | Carr | B42D 25/00 | 713/176 |
| 9,399,363 | B2 * | 7/2016 | Bi | B41M 3/14 | |
| 9,602,286 | B2 * | 3/2017 | Bae | H04L 9/3239 | |
| 9,607,462 | B2 * | 3/2017 | Blemel | G07D 7/2033 | |
| 10,007,964 | B1 * | 6/2018 | Calhoon | G06T 1/0021 | |
| 2006/0041506 | A1 * | 2/2006 | Mason | G06Q 10/10 | 705/42 |
| 2008/0087189 | A1 * | 4/2008 | Lin | B41M 3/144 | 106/31.9 |
| 2009/0112101 | A1 * | 4/2009 | Furness, III | G01J 3/02 | 600/477 |
| 2014/0270467 | A1 * | 9/2014 | Blemel | G07D 7/2033 | 382/143 |
| 2014/0331302 | A1 * | 11/2014 | Rouchouze | G07D 7/004 | 726/9 |
| 2016/0232734 | A1 * | 8/2016 | Guajardo Merchan | G07D 7/004 | |

FOREIGN PATENT DOCUMENTS

| | | | | | |
|---|---|---|---|---|---|
| WO | WO 0160047 | A2 * | 8/2001 | G07D 7/20 | |
| WO | 2013/156728 | A1 | 10/2013 | | |
| WO | 2013/160148 | A2 | 10/2013 | | |

* cited by examiner

METHOD FOR VERIFYING A SECURITY DEVICE COMPRISING A SIGNATURE

CROSS-REFERENCE TO RELATED APPLICATIONS

This application is a U.S. National Stage application of International Application No. PCT/FR2016/050880 filed 15 Apr. 2016, which claims priority to French Application No. 1553437 filed 17 Apr. 2015, the entire disclosures of which are hereby incorporated by reference in their entireties.

BACKGROUND

The present invention relates to the field of security devices. It is known to make a security device and to associate it with a document that is sensitive in terms of security, such as an identity document, in order to make said document secure. An effective security device is characterized in that it is difficult to produce or to reproduce, and difficult to modify in undetectable manner.

In known manner, an identity document includes an image associated with the holder of the identity document, such as an identity photograph. During an identity check, it is thus possible to compare an image comprising a photograph of the holder as present in the identity document, with an image acquisition performed on the bearer of the identity document in order to verify whether the acquired image does or does not correspond biometrically with the document image in order to determine whether the bearer is or is not the alleged holder.

Such a comparison is particularly probative when the image present on the identity document does indeed show the authorized holder. That is why it is appropriate to ensure that the image is indeed the authentic and original image as applied by an issuing authority, and that it has not been modified since it was issued.

In order to ensure that a counterfeiter can neither replace nor modify the image on the identity document, e.g. in order to attempt to reproduce the appearance of a bearer other than the holder, the image is advantageously associated with a security device. The security device is advantageously intimately linked with said image so that the security and authentication features of the security device also apply to the image.

BRIEF SUMMARY

The present invention proposes a multimodal verification technique suitable for verifying a security document including an image, and making it possible to detect and distinguish between various possible forgeries.

The present invention provides a method for verifying a security device including an image having a signature, the method comprising the following steps: acquiring the image in a first optical spectrum in order to obtain a first representation, extracting the signature, and verifying the signature.

According to another feature, the signature is colorimetric and comprises: an orientation of a color plate, and/or a particular set of base colors, and/or a particular hue.

According to another feature, the signature is a frequency signature, the image including at least one reference spatial period, and the method further comprises the following steps: applying a spectral transformation to the first representation in order to obtain a first transform including at least one first spatial period, verifying that the value(s) of the spatial period(s) correspond(s) to the value(s) of the reference spatial period(s).

According to another feature, the image is visible in the first optical spectrum and in at least one second optical spectrum, and the method further comprises the following steps: acquiring the image in the second optical spectrum in order to obtain a second representation, verifying that the two representations are graphically substantially identical, verifying that a distance between the two representations is below a threshold.

According to another feature, the threshold is equal to 10 micrometers (μm), preferably equal to 5 μm.

According to another feature, the distance between the two representations is determined by means of a registration algorithm to identify a transformation for which one of the representations is the image of the other representation.

According to another feature, the first optical spectrum is situated in the visible spectrum, and/or the second optical spectrum is situated in the infrared.

According to another feature, the method further comprises the following steps: applying the same transformation to the second representation in order to obtain a second transform, verifying that the first transform is substantially equal to the second transform.

According to another feature, the method further comprises a step of: verifying that the value(s) of the spatial period(s) of the second transform correspond(s) to the value(s) of the reference spatial period(s).

According to another feature, the spectral transformation is applied to at least one portion of the first representation and/or to the same at least one portion of the second representation.

According to another feature, the spectral transform is applied to at least two portions of a representation, and the method further comprises a step of: verifying that the transforms of the different portions are substantially equal.

According to another feature, the method further comprises a step of: verifying that the two representations are colorimetrically different.

According to another feature, the image represents a portion of the body, preferably the face, the eye, or the finger, of a holder associated with the security device, and the method further comprises the steps of: acquiring an image of the portion of the body from a bearer of the security device, verifying that the acquired image corresponds biometrically with the first representation, and/or verifying that the acquired image corresponds biometrically with the second representation.

According to another feature, the security device is associated with digital storage means including a digital representation of the image, and the method further comprises the steps of: reading the digital representation of the image, verifying that the digital representation is substantially identical to the first representation, and/or verifying that the digital representation is substantially identical to the second representation.

According to another feature, the method further comprises a step of: verifying that the acquired image corresponds biometrically with the digital representation.

The invention also provides verification apparatus including means for implementing such a verification method.

The invention also provides a computer program including a sequence of logic instructions suitable for implementing such a verification method.

The invention also provides a computer data medium including such a computer program.

BRIEF DESCRIPTION OF THE DRAWINGS

Other features, details, and advantages of the invention appear more clearly from the detailed description given below by way of indication and with reference to the drawings, in which.

DETAILED DESCRIPTION

Figure 1:
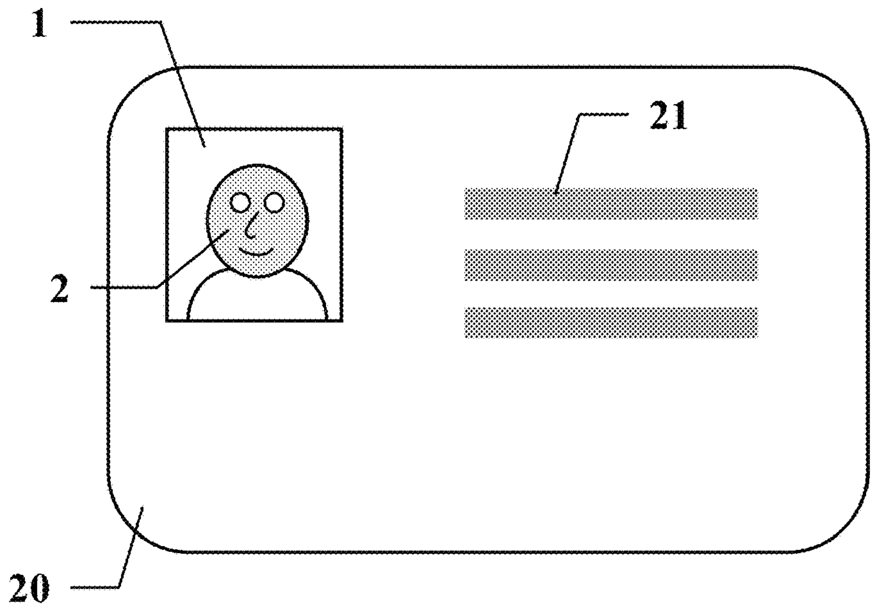
FIG. 1 shows an identity document including an image associated with a security device.

FIG. 1 shows an identity document 20 having at least one image 2. Where appropriate, the identity document 20 may have other elements 21. The image 2 is made in such a manner as to incorporate a security device 1. According to a feature, the security device 1 consists in the image 2 including a signature. A signature is a specific feature of the image 2 that is capable of being detected, typically by an analyzer tool. A signature is usually a consequence of the way the image 2 is made or of the machine used for making the image 2. A signature can thus be intrinsically linked with the way the image is made. Alternatively, a signature may be voluntarily introduced into the image 2 in order to enable it to be detected therein for verification purposes.

The nature of a signature may be very varied. Several non-limiting examples are described below.

The verification of such a security device 1 comprises the following steps. A first step acquires the image 2 using a first optical spectrum in order to obtain a first representation 3.

Such an acquisition is performed by illuminating the image 2 with light having the desired optical spectrum and making the representation 3, 4 by an acquisition, typically by means of an image sensor that is sensitive in said desired optical spectrum. The result that is obtained, i.e. a representation 3, 4, is an image that may be digitized and stored in a computer memory and is conventionally organized in the form of an image, i.e. a two-dimensional matrix of pixels.

In the present document, an optical spectrum may be defined by at least one optical frequency band. An optical spectrum may thus be all or part of the infrared spectrum, or all or part of the X-ray spectrum, all or part of the ultraviolet spectrum, or indeed all or part of the visible spectrum, or any combination of the above.

Thus, obtaining a representation 3, 4 in an optical spectrum, such as for example the infrared optical spectrum, assumes that the image 2 is illuminated by a source covering at least the desired infrared optical spectrum and that the representation 3, 4 is acquired simultaneously by means of a sensor, such as a camera, that is sensitive at least in the desired infrared optical spectrum. The representation that is obtained is an image, i.e. a two-dimensional matrix of pixels, in which each pixel comprises a single intensity, indicative of the optical radiation in the optical spectrum under consideration that is reflected by the image 2. Such a representation 3, 4 is generally in the form of a monochrome image.

In the particular circumstance of an optical spectrum including at least partially the visible optical spectrum, a pixel may comprise a plurality of intensities, indicative of the intensities of primary colors. A representation 3, 4 is then in the form of a polychrome image, i.e. in the form of a superposition of a plurality of monochrome images, referred to as component images.

During a second step, the signature is then extracted. The way in which this extraction step is performed depends on the nature of the signature. During a third step, the signature is verified in order to check whether the signature extracted from the representation 3 derived from the image 2 does indeed correspond to a signature of the kind that ought to be present, in that it was introduced and inserted in the image 2 during fabrication of the image 2. Once again, the way this verification step is performed depends on the nature of the signature and is described in detail below.

In a first implementation, the signature is colorimetric. This still covers numerous operating procedures, which are illustrated by non-limiting examples. A general idea for this type of signature is to take advantage of technological advances in terms of fabrication means and verification means, generally observed among manufacturers in the field of security devices, and/or authorities issuing identity documents, in comparison with counterfeiters.

A first example of a colorimetric signature uses the orientation of a given color plate. Thus, in an offset printing process, each base color (e.g. RGB (K) or CMY (W)), of which there are typically two to five, is printed by means of a color plate. In order to avoid unwanted moire effects, each such color plate is oriented at a different angle, so that each color plate is angularly spaced apart relative to the others. The angle of each color plate is thus characteristic of a printing machine.

A very accurate measurement of this set of angles, or even of a deliberate modification to at least one angle, can make it possible to identify and/or particularize a printing machine, and more generally an issuing organization. With accurate verification tools, it is thus possible to use at least one of the angles in this set of angles as a signature.

A second example of a colorimetric signature uses the precise hues of each color plate. Each color plate has a base color. The various colors of the various color plates thus define a colorimetric base, like a vector base. The base colors must comprise colors that are substantially distributed in order to have good ability to express color. It is thus known to use a Red, Green, and Blue (RGB) base, possibly together with White and/or black. Another base is Cyan, Magenta, and Yellow (CMY). However it is possible to define any n-tuple of base colors, or indeed to start from a conventional triplet and modify at least one of the base colors a little by offsetting its hue a few %. An accurate measurement can thus accurately detect a printing machine, by relying solely on the inevitable dispersion from one machine to another, or indeed by creating a deliberate offset. A deliberate offset is advantageous in that it enables all of the machines belonging to a single entity to be particularized and thus to characterize an issuer, such as a service or a state.

A third example of a colorimetric signature is using a particular hue. Such a hue, in a particular combination of base colors can thus be used to make a specific portion of an image 2. By way of example, it may be a frame, or even a particular spot, that is made with a given absolute or relative hue definition that can be verified with great accuracy. The position of the spot used may itself be part of the signature.

In another implementation, the signature is a frequency signature. For this purpose, the image 2 includes at least one reference spatial period. Once again, several implementations are possible and some are illustrated below. The reference spatial period may be intrinsic, in that it is introduced by the method for fabricating the image 2, or indeed it may be artificial, in that it is added to the image.

The presence of at least one such reference spatial period constitutes a signature for which it is possible to verify its presence and its quality. Given the way the image 2 is made, the period(s) 6, 7 is/are incorporated in all of the surface area of a representation 3, 4 and must be equal to the reference spatial period(s) present originally in the security device 1.

The signature is then extracted by the following steps. A spectral transformation 8 is applied to the first representation 3. This makes it possible to obtain a first transform 9.

Because of the decomposition into a series of periodic functions, such a spectral transformation 8 is characterized in that when it is applied to an image/representation it reveals the spatial frequencies that are present in said image/representation. Such a spectral transformation 8 may be any transformation that performs decomposition into a series of functions. A transformation of this type that is in widespread use, because it is advantageously associated with a digital implementation that is effective and fast, is the fast Fourier transform (FFT). Such a transformation may be unidimensional. With a transformation 8 that is applicable to an image, there exists a two-dimensional version of the transformation (two-dimensional fast Fourier transform FT2) that transforms a representation 3, 4 corresponding to an image into a spectrum/transform 9, 10, itself corresponding to an image. A point of high intensity, represented by a black dot in the figures, is indicative of a spatial period 6, 7 being present in the representation 3, 4.

An absolute verification step is then performed to verify that the value(s) of reference spatial period(s), at least the most remarkable one(s), correspond(s) to the value(s) of the period(s) 6 of the first transform 9.

This correspondence is verified while accepting a certain amount of tolerance in order to accommodate possible measurement and/or calculation errors. It is thus verified that a point of the transform 9, representing a spatial period, does indeed correspond to a reference spatial period, to within tolerance.

The value of this tolerance must be capable of being configured so as to take account of the performance of the optical sensor used. A tolerance equal to 50 μm may be used for a low performance sensor. Nevertheless, this tolerance should be selected to be as small as possible. A tolerance preferably equal to 30 μm, and more preferably equal to 10 μm, should be used if the performance of the sensor makes that possible. When using a mobile sensor, such as a smartphone camera, the value of the threshold may be adapted as a function of the variable distance at which the acquisition is made.

This step of frequency verification serves to verify that the image 2 corresponds to the original image as made by the organization issuing the security device 1, and that it does indeed include the reference frequencies that were originally present. This can make it possible to discriminate a counterfeit attempting to modify all or part of the image 2 without satisfying said reference frequency.

According to another feature, the image 2 is made in such a manner as to be visible in a first optical spectrum and in at least one second optical spectrum. The first optical spectrum and said at least one second optical spectrum are advantageously disjoint in pairs.

Several implementations that enable such a feature of the image 2 to be obtained are described in greater detail below. It should be observed that, by construction, the security device 1 is characterized by a particular component constituting the image 2 being visible both in a first optical spectrum and also in at least one second optical spectrum.

It may also be observed that such a feature enables the security device 1 to be intimately linked with the image 2, thus making any separation practically impossible. Such a security device 1, if verified, thus authenticates in relatively certain manner its own authenticity and origin, and thus the authenticity and the origin of the image 2.

Figure 2:
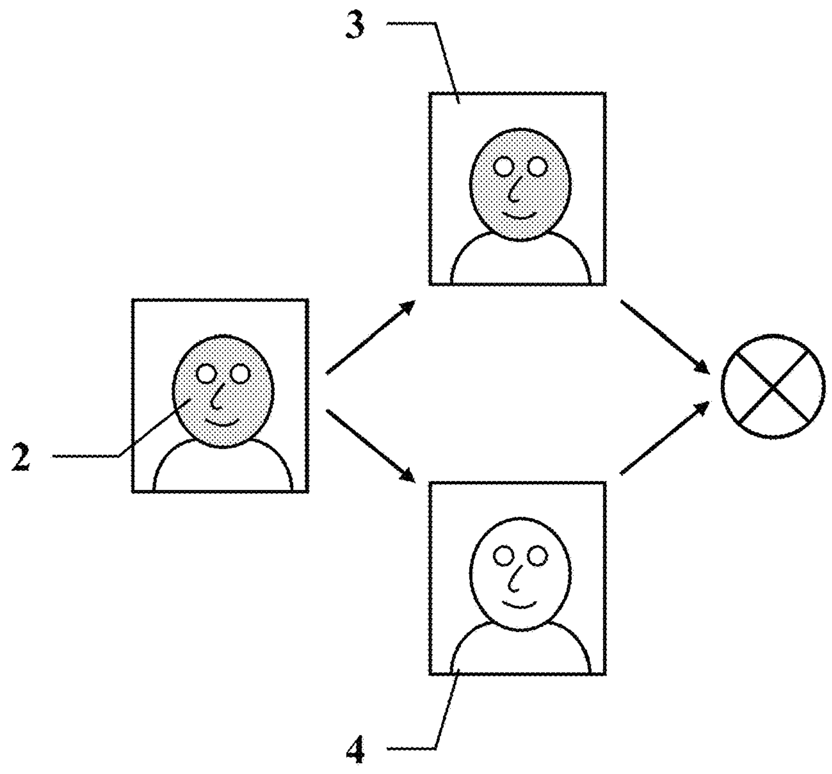
FIG. 2 shows a step of the verification method, making a comparison between two representations of the image acquired using different optical spectra.
Figure 3:
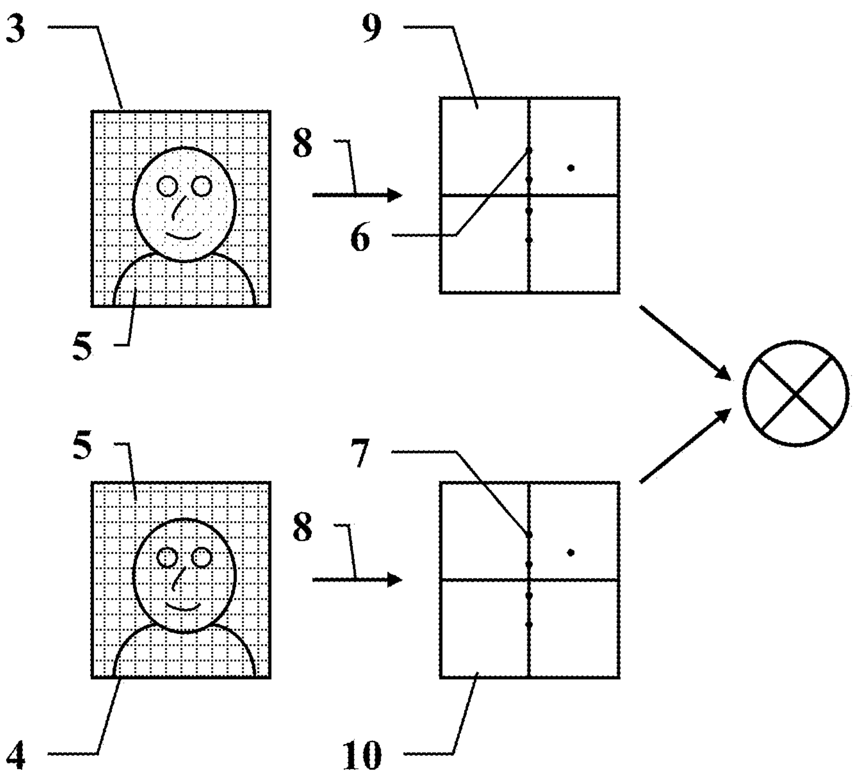
FIG. 3 shows another step of the verification method using a spectral transformation.

Such a security device 1 is verified by performing the following steps, shown in FIG. 2. A first step acquires the image 2 in a first optical spectrum in order to obtain a first representation 3. A second step acquires the image 2 in the second optical spectrum in order to obtain a second representation 4.

Such an acquisition is performed by illuminating the image 2 with illumination in the desired optical spectrum and by acquiring the representation 3, 4, typically by means of an image sensor that is sensitive in said desired optical spectrum. The result that is obtained, i.e. a representation 3, 4, is an image that can be digitized and stored in a computer memory and it is conventionally organized in the form of an image, i.e. a two-dimensional matrix of pixels.

In the present document, an optical spectrum may be defined by at least one optical frequency band. An optical spectrum may thus be all or part of the infrared spectrum, or all or part of the X-ray spectrum, all or part of the ultraviolet spectrum, or indeed all or part of the visible spectrum, or any combination of the above.

Thus, obtaining a representation 3, 4 in an optical spectrum, such as for example the infrared optical spectrum, assumes that the image 2 is illuminated by a source covering at least the desired infrared optical spectrum and that the representation is acquired simultaneously by means of a sensor, such as a camera, that is sensitive at least in the desired infrared optical spectrum. The representation that is obtained is an image, a two-dimensional matrix of pixels, in which each pixel comprises a single intensity, indicative of the optical radiation in the optical spectrum under consideration that is reflected by the image 2. Such a representation 3, 4 is generally in the form of a monochrome image.

In the particular circumstance of an optical spectrum including at least partially the visible optical spectrum, a pixel may comprise a plurality of intensities, indicative of the intensities of primary colors. A representation 3, 4 is then in the form of a polychrome image, i.e. in the form of a superposition of a plurality of monochrome images, referred to as component images.

As mentioned above, by construction, a given component making up the image 2, forms the image 2 and is visible using different optical spectra. This feature is used for verification purposes by comparing the two representations 3, 4 in order to verify that both representations 3, 4 are graphically substantially identical. Furthermore, during a second step, it is verified that the two representations 3, 4 have not been offset relative to each other, in that a distance 5 between the two representations 3, 4 remains below a threshold.

Thus, as shown in FIG. 2, it is verified that the first representation 3 shows a first pattern that is substantially graphically identical to a second pattern shown by the second representation 4.

Once this first step has been successful, it is possible to determine a distance between the first pattern and the second pattern and to verify that this distance is below a threshold.

It follows that the security device 1 is successfully verified if and only if both preceding tests are successful: the first pattern is graphically substantially identical to the second pattern, and the distance between the two patterns is below the threshold.

The security device 1 is designed in such a manner that a given component of the image 2 is visible in the first optical spectrum and in said at least one second optical spectrum. Any offset or distance between the two representations 3, 4 should theoretically be zero. In order to accommodate measurement and/or calculation inaccuracies, tolerance is introduced in the form of said threshold. Nevertheless, the threshold should be selected to be very small. In order to be able to discriminate between an authentic device in which the image visible in a first optical spectrum is made jointly and simultaneously with the image visible in a second optical spectrum, and a potential counterfeit in which a first image visible in a first optical spectrum and a second image visible in a first optical spectrum and aligned with the first image are made in two steps, it is appropriate for said threshold to be smaller than the registration capabilities of existing producing technologies and machines. A threshold equal to 10 μm, and preferably equal to 5 μm, satisfies this need in that such registration performance is impossible whatever the technology used.

It has been seen that a first verification step consists in comparing the first representation 3 with the second representation 4 and in testing graphical identity between the two representations. Numerous image processing techniques can be applied to make such a comparison.

In an illustrative implementation, it can be verified that the two representations 3, 4 are identical by using a known registration algorithm to identify a transformation for passing from one representation 3 to the other representation 4. Under such circumstances, verification is successful if said transformation is sufficiently close to the identity transformation. An advantage of this approach is that identifying the transformation also provides the distance between the two representations 3, 4, which distance can then be compared with the threshold, the distance being given as the modulus of the transformation.

When at least one of the representations 3, 4 is a polychrome image, the comparison may be applied to any one of the component images of said polychrome image, or indeed after preprocessing of the polychrome image in order to make it monochrome, using any method whatsoever (averaging, saturation, etc., . . . ).

The two optical spectra may be arbitrary, providing that a component is available that is visible simultaneously in both of these optical spectra and that can be used for making the image 2.

Advantageously, in order to make certain tests possible with the naked eye, one of the optical spectra is situated in the visible spectrum. An optical spectrum included in the visible spectrum also presents the advantage of simplifying illumination of the image 2 when making the acquisition, since it can be done in daylight or indeed with any conventional type of artificial lighting.

The use of the visible spectrum is also advantageous in that it makes it possible to obtain a polychrome representation. As described below, a polychrome image can provide an additional verification.

Alternatively, one of the optical spectra may be situated in the ultraviolet (UV).

Alternatively, one of the optical spectra may be situated in the infrared (IR).

Such optical spectra that are not situated in the visible improve security in that a counterfeiter does not necessarily detect that they are being used. They complicate the verification step a little in that specific lighting and acquisition means are necessary. Nevertheless, it should be observed that for an identity document 20, inspection sites such as border crossings are usually already provided with scanners capable of performing IR or UV acquisition.

Implementations of the image 2 enabling it to be visible in at least two optical spectra are described in greater detail below.

Some of these implementations contribute, intrinsically or artificially, to giving the image 2 a frequency signature so that it includes at least one spatial period.

As mentioned above, the frequency signature of an image 2 can be verified in absolute manner.

When the image 2 is visible in at least two optical spectra, it is also possible to apply relative verification. For this purpose, the same transformation 8 is again applied to the second representation 4. This makes it possible to obtain a second transform 10.

On the basis of these transforms 9 and 10, it can be verified that the first transform 9 is substantially equal to the second transform 10.

This equality can be tested by numerous methods. If the transforms 9 and 10 are images, it is possible to apply any image comparison method thereto, such as the method described above for comparing the representations, and verifying that they are identical (registration identifying).

Under all circumstances, the transforms 9 and 10 show points that are characteristic of remarkable periods. It is possible to use methods that extract a set of the p most remarkable periods for each of the transforms 9 and 10 and then to compare the p periods in each of the sets. It is considered that two transforms are equal if at least certain portions of the remarkable periods of one transform 9 are to be found in the set of remarkable periods for the other transform 10.

If equality is found, then the verification step is positive and the security device 1 is deemed to be successfully verified and thus valid. Otherwise, the verification step is negative and the security device 1 and/or its authenticity are doubtful.

The above verification step is relative in that it compares the transforms 9 and 10 of the two representations 3, 4, respectively. This makes it possible to verify that the image 2 was indeed made jointly concerning its portion 3 visible in a first optical spectrum and its portion 4 visible in at least one second optical spectrum, and that substantially the same frequency spectra are to be found in both representations 3 and 4, indicative of the presence of a single original frequency signature 5.

The absolute verification step performed on the first transform 9 can also be applied to the second transform 10 in order to verify that reference period(s), at least the most remarkable one(s), is/are indeed present in the period(s) 7 of the second transform (10). This second frequency verification step serves to verify whether the particular periodicity of the image 2 corresponds to particular periodicity of the organization issuing the security device 1.

In a first implementation, the spectral transformation 8 is applied to all of the first representation 3 and/or, likewise, to all of the second representation 4.

Alternatively, in another implementation, the spectral transformation 8 is applied to at least one portion of the first representation 3 and to the same at least one portion of the second representation 4. Each of these partial transforms can be then be compared to a partial transform of the other representation, e.g. the corresponding partial transform, which comparison may be performed portion to portion, although that is not essential, and/or to another partial transform of the same representation.

Figure 4:
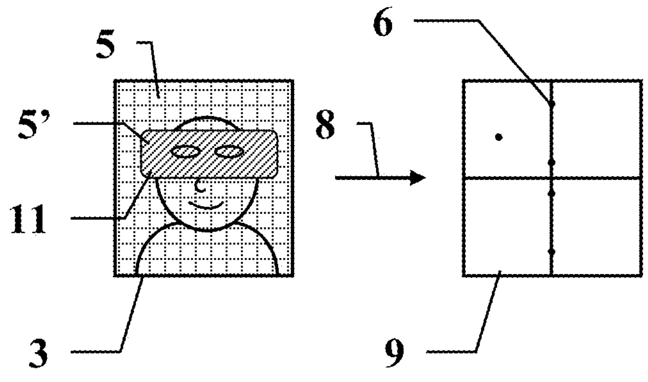
FIG. 4 shows a possible counterfeit, which a spectral transformation is capable of detecting.

An advantage of verification making use of a spectral transformation 8 is illustrated below with reference to FIG. 4.

It is assumed that an image 2 is forged in order to modify at least a portion 11 thereof. Thus, as shown in FIG. 4, a modified portion 11 seeks to modify the eyes in an identity photograph. Although the original image 2 and thus its representation 3 includes a frequency signature 5, the portion 11 that has been modified, whether by being added or by being replaced, and regardless of the technology used, is very likely to present a frequency signature 5' that is different from the original frequency signature 5, which includes the situation in which no frequency signature 5' is present. Thus, comparing the spectrum transforms 9 and 10 of all or part of a representation 3, 4 necessarily causes a detectable difference to appear.

Several implementations are described below suitable for obtaining an image 2 including a security device 1 that is visible in a first optical spectrum and in at least one second optical spectrum.

In a first implementation, a security device 1 may be an image 2 made in known manner by monochromatic laser etching. Such a security device 1 is known and very widespread in this technical field. The principle is to have a laser-sensitive layer in which it is possible to use a laser beam to produce localized carbonization. Using a laser, it is thus possible to draw and make an image 2. This implementation enables an image such as an identity photograph to be made, which image is necessarily a monochrome image. It is known that a dot of the image 2, as blackened by the laser, is visible in a first optical spectrum: the visible spectrum, and that furthermore a dot of the image 2 is also visible in a second optical spectrum: the infrared spectrum.

At this point, it should be observed that this property of being visible in at least two optical spectra is known and is used by inspectors. For an image that has been obtained by monochrome laser etching, it is verified that the image is visible in the visible optical spectrum and that it is also visible in the IR optical spectrum. This enables an inspector to verify that the image present was indeed made by monochrome laser etching. Nevertheless, at present, this verification is purely human and qualitative: the controller verifies visually that the image can be seen in both optical spectra. Nevertheless, the prior art does not verify that the two representations 3, 4 are identical, nor does it verify that their distance is below a threshold. The invention provides a quantitative approach and advantageously enables those two operations to be performed automatically, with much more accuracy, and including decision making.

In another implementation, a security device 1 may be an image 2 made by color laser etching. For this purpose, a security device 1 has an arrangement including a color matrix. The color matrix is a table of pixels, each pixel comprising at least two sub-pixels of colors that are advantageously primary and different. In a first implementation, the color matrix is sensitive to the laser, such that a laser shot enables each pixel selectively to express a hue by combining the primary colors of the sub-pixels. In another implementation, the color matrix is not sensitive to the laser, and said arrangement includes at least one layer that is sensitive to the laser. Said at least one sensitive layer is arranged above and/or below the color matrix. Laser etching, using the above-described monochrome technology, then serves to make a monochrome mask in said at least one sensitive layer, thereby enabling each pixel selectively to express a hue by combining the primary colors of the sub-pixels.

These two implementations enable a color image to be made by laser etching. Once again, the dot carbonized by laser and constituting the image 2 is visible simultaneously in the visible optical spectrum and in the IR optical spectrum. It therefore constitutes a single component that is necessarily situated at the same location in the first representation 3 and in the second representation 4.

In yet another implementation, a security device 1 may be an image 2 made by a printing technique. The printing technique may be any printing technique: offset, silkscreen printing, retransfer, sublimination, ink jet, etc., . . . , so long as it uses an ink having at least one component that is visible in the first optical spectrum and in the second optical spectrum. This component, incorporated in the ink, thus determines the optical spectra in which the image 2 can be seen. The image 2 may thus be invisible in the visible spectrum but be visible in the IR and in the UV spectra. The printing of the image 2 creates image dots that are visible simultaneously in the at least two optical spectra. Once again, an image dot is a single component, that is necessarily situated at the same location in the first representation 3 and in the second representation 4.

A simplified counterfeiting technique consists in making a monochrome image 2. Thus, a counterfeiter may be tempted to make a monochrome image 2, which is easier to fabricate or requires simpler tooling. Thus, a polychrome print can be replaced by a monochrome print. Likewise, a counterfeiter may have a monochrome etching laser available and be good at using that technology, which is already quite old, and may be attempted to replace a color image 2 created by laser etching with a monochrome image 2 created by laser etching, where color laser etching is a technology that is very recent and still not very widespread, and is very likely difficult for a counterfeiter to obtain.

Thus, providing the authentic security device 1 has a color image and at least one of the optical spectra is the visible spectrum, the verification method may advantageously include an additional step of verifying that the two representations 3 and 4 are colorimetrically different. Thus, typically, one of the representations shows a polychrome acquisition of the image 2 while the other representation, e.g. because it is visible in an optical spectrum lying outside the visible spectrum, shows a monochrome acquisition. This verification step checks that color is indeed present in one of the representations. The representations 3, 4 in this example are colorimetrically different, even if they are graphically identical (same pattern).

The colorimetric difference may be verified by any colorimetric processing method. In one possible implementation, the representations 3, 4 may be modeled using a CIE Lab colorimetric model. It can then be verified that the representation that ought to be in color does indeed present generally high values for the coefficients a and b, whereas the representation that is supposed to be monochrome is gray and presents small values for the coefficients a, b. An analogous approach would be to convert the representations 3, 4 using a hue lightness and saturation (HLS) model, and observing the value of the saturation S.

Three implementations are described above of a security device 1 that is visible using at least two optical spectra: monochrome laser etching, color laser etching, and printing with a special ink.

An image 2 made by monochrome laser etching has a frequency signature 5 because the laser shots are performed according to a shot matrix. Such a shot matrix, e.g. a rectangular matrix, is advantageously periodic. There thus appears, spacially, at least one period 6, 7 per dimension. With a rectangular matrix, there can thus appear one period 6, 7 along a first axis and a second period 6, 7 along the other axis of the matrix.

Thus, if a spectral transformation 8 is applied to a representation 3, 4 coming from such an image 2, the transform 9 of the representation 3 is equal to the transform 10 of the representation 4. This spectral transformation 8 reveals at least the two periods 6, 7, and does so for both of the optical spectra. If the rectangular matrix is oriented parallel to the image 2, and if the spectral transformation 8 is an FFT2, at least one first point 6, 7 will appear on the ordinate axis, being representative of the period along the abscissa axis and at least one second point will appear on the abscissa axis, representative of the period along the ordinate axis.

An image made by color laser etching usually intrinsically includes a frequency signature 5 in that the arrangement enabling such a color image 2 to be etched itself includes a color matrix. Although this is not essential, in order to facilitate etching, the pixels and the sub-pixels comprising the colors are advantageously arranged in said color matrix in a manner that is periodic. It is thus possible, in at least one dimension, to find a main period 6, 7 corresponding to the distance between the pixels. Furthermore, each pixel comprises a number n of at least two sub-pixels, and conventionally of four (Cyan, Magenta, Yellow, Black), each subpixel comprising one base color. These n colors are advantageously evenly distributed spatially, thereby forming a secondary spatial period that is an n-submultiple of the main period 6, 7.

In an implementation, the color matrix is arranged in rows, e.g. horizontal rows, alternating with a sequence that advantageously repeats identically every n colors.

The color matrix is theoretically visible only in the visible optical spectrum. Nevertheless, the dots made by laser etching are visible both in the visible optical spectrum and also in the infrared (IR) optical spectrum. Thus, in an etched image 2, the etched dots are necessarily arranged on the color matrix and therefore cause the main spatial periods 6, 7 and the secondary spatial periods of the color matrix to appear. This feature assumes that the density of the etched dots is sufficient. This is true for a complex image and in particular for a photograph. The main spatial periods 6, 7 and the secondary spatial periods appear both in the first transform 9 from the representation 3 using a first optical spectrum, herein the visible spectrum, and in the second transform 10 from a representation 4 using a second optical spectrum, herein the IR spectrum.

For an authentic security device 1, the same frequency signature 5 from the color matrix is revealed and shown up by the etched dots and the two transforms 9 and 10 should be substantially identical. Furthermore, the periods 6, 7 revealed by the spectral transformation 8 must correspond to the main reference period of the frequency signature 5, as fabricated, and also to its secondary reference periods, if any.

An image 2 made using a printing method does not necessarily have a frequency signature 5. Nevertheless, certain printing methods can give rise to a periodic arrangement of dots, which then form a frequency signature 5, having at least one spatial period 6, 7 being the distance between the dots. The periodic pattern thus forms a frequency signature 5 that can then be used for verifying the security device 1 by applying a spectral transformation 8.

In another implementation, it is possible to include an additional frequency signature in the image 2 that is voluntarily added thereto, by printing a periodic pattern. It is thus possible to insert a frequency signature 5 into an image 2 by replacing certain dots or rows, advantageously arranged periodically, with a given color. Thus, like a color matrix suitable for making a color image by laser etching, or indeed in an attempt to simulate such a matrix, it is possible to modify an image 2 by replacing one in every p rows with a black row. This modifies the image 2 sufficiently little for it to remain usable, while giving it a frequency signature 5 that is usable for verification purposes after applying a spectral transformation 8.

If an image 2 is also printed with a special ink, it is possible to verify the presence, the similarity and the distance of both representations 3, 4 derived from acquisitions according to at least two optical spectra. If the image 2, or at least said additional frequency signature 5, is printed using a special ink, then the frequency signature 5 as made in this way is visible in at least two optical spectra and must be present in both transforms 9 and 10 derived from the two representations 3 and 4, so that these two transforms are then equal.

According to another feature, the image 2 represents a portion of the body of a holder associated with the security device 1. The verification method may also include the following steps. A first step consists in acquiring an image of said portion of the body from the bearer of the security device 1. A second step verifies that this acquired image corresponds biometrically with the image 2 of the security device 1. The image 2 of the security device 1 is deemed to be a representation of the authorized holder. Thus, if a biometric correspondence is found with a direct acquisition from the bearer accompanying the security device 1, it can be assumed that the bearer is indeed the holder he or she claims to be.

If the image 2 is visible in two optical spectra, the verification can be duplicated, verifying that the acquired image 13 corresponds biometrically to the first representation 3, and/or verifying that the acquired image 13 corresponds biometrically with the second representation 4.

The term "biometrical correspondence" is used herein since such a step of comparing a live acquisition from the bearer with an image 2 associated with the security device 1, coming from an acquisition that was performed when it was issued, and perhaps some time ago, such that the appearance of the holder might have changed, is necessarily more complex than verifying whether two images are identical. The corresponding biometric techniques are assumed to be known.

This applies for example to the situation in which the portion of the body is the face, the image 2 then representing an identity photograph of the bearer of an identity document 20 associated with said security device 1. In another implementation, it may be the eye, one of the fingers, or any other portion of the body.

The verification method thus combines a plurality of verification steps targeting different aspects for checking. It is verified that the image 2 is authentic and that it is not possible that it has been modified since the security device 1 was issued. It is also verified that the bearer corresponds to the holder. The guarantees provided by each of these verifications reinforce the security of the security device 1.

According to another feature, the security device 1 is associated with digital storage means including a digital representation of the image 2. Such storage means are typically a secure device (SD), such as a microcircuit, proposing services for accessing an internal memory in secure manner. The digital representation of the image 2 was previously stored in controlled manner by the authority issuing the security device 1. It is therefore deemed to be a representation of the holder. The secure aspect guarantees that it has not been modified.

Such a feature makes it possible to provide redundancy for the security device 1 and to add to the verification method by adding another verification by means of the following steps. In a first step, the digital representation of the image 2 is read from the storage means. In a second step, the method compares the digital representation with one and/or both representations 3, 4. The verification is deemed to be successful if the digital representation is substantially identical to all of the representations 3, 4 with which it is compared.

If an acquisition of an image of the bearer is performed, it is also possible to add another verification by testing for biometric correspondence between said image acquired from the bearer and the digital representation of the image 2 from the storage means.

The various features of the verification method having been described, the description continues with utilization scenarios serving to show the capacities for discrimination of each of the verifications.

Utilization Scenario A—Authentic Device

An authentic identity document 20 having both an image 2 showing an identity photograph made by color laser etching and also a microcircuit containing a digital representation of the identity photograph is inspected.

The verification method makes an acquisition, advantageously in color, of the image 2 in the visible spectrum in order to obtain a first representation 3, a monochrome acquisition of the image 2 in the IR spectrum in order to obtain a second representation 4, and a direct acquisition, advantageously in color, of the face of the bearer, and extracts a digital representation from the microcircuit.

A first verification confirms that the (visible) first representation 3 is graphically identical and very close to the (IR) second representation 4.

A second verification confirms that the direct acquisition corresponds biometrically with the (visible) first representation 3, and corresponds biometrically with the (IR) second representation 4.

A third verification confirms that the digital representation from the microcircuit is identical to the (visible) first representation 3, is identical to the (IR) second representation 4, and corresponds biometrically with the direct acquisition.

A fourth verification applies a spectral transformation 8 both to the representation 3, advantageously been made monochrome, and also to the representation 4, compares the two transforms 9 and 10 that are obtained in order to verify that they are equal, and verifies that the spatial periods 6, 7 as detected are the periods of the frequency signature 5 of the color matrix used. The presence of the frequency signature 5 of the original color matrix, visible both in the visible spectrum and in the IR spectrum, ensures that both transforms 9 and 10 are equal and that their periods 6 and 7 correspond to the periods of the original color matrix.

A fifth verification verifies that the color representation 3 differs colorimetrically from the monochrome representation 4.

Utilization Scenario B—Forged Device 1

An identity document 20 is forged in that it has an image 2 made by printing.

The image 2, printed in this example, presents no visibility in the IR. Thus, the second representation 4 is a blank image. The printed image does not have any frequency signature 5.

The first verification fails in that it detects a difference between the (visible) first representation 3 and the (IR) second representation 4 (which has no content).

It may be assumed that the counterfeiter made an image 2 representing a photograph of the bearer. The second verification succeeds in that a biometric correspondence is found for the (visible) first representation 3. However, it fails for the (IR) second representation 4.

Providing the counterfeiter was able to modify the digital representation in the microcircuit, the third verification succeeds in that an identity is found for the (visible) first representation 3 and a biometric correspondence is found with the direct acquisition. However, it fails for the (IR) second representation 4. If the counterfeiter has not managed to modify the digital representation in the microcircuit, then all of the verifications fail.

Because of the absence of a frequency signature 5 in the forged printed image 2, the fourth verification may find equality between the two transforms 9 and 10 (no meaningful spectrum) but fails in that it does not find the periods of the color matrix, neither in the transform 9 from the visible spectrum, nor in the transform 10 from the IR spectrum.

The fifth verification succeeds in that the image 2 is in color.

Utilization Scenario C—Forged Device 2

An identity document 20 is forged in that it has an image 2 made by monochrome laser etching.

The image 2, which is laser etched herein, is visible in the visible and in the IR and presents two representations 3 and 4 that are identical and superposed (not spaced apart). The monochrome etched image does not have a frequency signature 5.

The first verification succeeds in that it detects a (visible) representation 3 that is identical to and superposed on the (IR) second representation 4.

It may be assumed that the counterfeiter made an image 2 representing a photograph of the bearer. Thus the second verification succeeds in that biometric correspondence is found, both for the (visible) first representation 3 and for the (IR) second representation 4.

Providing the counterfeiter was able to modify the digital representation in the microcircuit, the third verification succeeds in that an identity is found for the (visible) first representation 3, for the (IR) second representation 4, and a biometric correspondence is found with the direct acquisition.

Because of the absence of a frequency signature 5 in the forged etched image 2, the fourth verification may find equality between the two transforms 9 and 10 (no meaningful spectrum) but fails in that it does not find the periods of the color matrix, neither in the transform 9 from the visible spectrum, nor in the transform 10 from the IR spectrum. In the particular situation in which a frequency signature is present, it does not in any way resemble a frequency signature 5 of a color matrix, and the spectral verification fails.

The fifth verification fails in that the image 2 is monochrome.

Utilization Scenario D—Forged Device 3

An identity document 20 is forged in that it includes an image 2 made by printing, said printing including lines simulating a frequency signature 5 of a color matrix.

The image 2, printed herein, presents no visibility in the IR. Thus, the second representation 4 is a blank image. The printed image includes a convincing frequency signature, but only in the visible.

The first verification fails in that it detects a difference between the (visible) first representation 3 and the (IR) second representation 4 that has no content.

It may be assumed that the counterfeiter made an image 2 representing a photograph of the bearer. The second verification succeeds in that a biometric correspondence is found for the (visible) first representation 3. However, it fails for the (IR) second representation 4.

Providing the counterfeiter was able to modify the digital representation in the microcircuit, the third verification succeeds in that an identity is found for the (visible) first representation 3 and a biometric correspondence is found with the direct acquisition. However, it fails for the (IR) second representation 4.

If the printed frequency signature is made sufficiently well to simulate a frequency signature 5 in the visible, the fourth verification can succeed in that it finds an acceptable transform 9 in the visible. However, the fourth verification fails in that the transform 10 in the IR is not acceptable (no meaningful spectrum) and it is also not equal to the (visible) transform 9.

The fifth verification succeeds in that the image 2 is in color.

The invention claimed is:

1. A method for verifying a security device including an image having a signature, wherein the method comprises the following steps:

- acquiring the image in a first optical spectrum in order to obtain a first representation;
- extracting the signature; and
- verifying the signature, wherein:

- the signature is colorimetric and comprises a particular orientation of a color plate, or
- the signature is a frequency signature and the image includes at least one reference spatial period.

2. A method according to claim 1, wherein when the signature is a frequency signature and the image includes at least one reference spatial period, the method further comprises the following steps:

- applying a spectral transformation to the first representation in order to obtain a first transform including at least one first spatial period; and
- verifying that the value of the at least one first spatial period corresponds to the value of the at least one reference spatial period.

3. A method according to claim 2, further comprising the following steps:

- applying the spectral transformation to the second representation in order to obtain a second transform that includes at least one second spatial period; and
- verifying that the first transform is substantially equal to the second transform.

4. A method according to claim 3, further comprising a step of:

- verifying that the value of the at least one second spatial period of the second transform corresponds to the value of the at least one reference spatial period.

5. A method according to claim 3, wherein the spectral transformation is applied to at least one portion of the first representation and/or to the same at least one portion of the second representation.

6. A method according to claim 5, further comprising a step of:

- verifying that the first representation and the second representation are colorimetrically different.

7. A method according to claim 3, wherein the spectral transformation is applied to at least two portions of a representation to produce at least two transforms, and in which the method further comprises a step of:

- verifying that the at least two transforms of the at least two portions are substantially equal.

8. A method according to claim 1, wherein the image is visible in the first optical spectrum and in at least one second optical spectrum, and in which the method further comprises the following steps:

- acquiring the image in the at least one second optical spectrum in order to obtain a second representation;
- verifying that the first representation and the second representation are graphically substantially identical; and
- verifying that a distance between the first representation and the second representation is below a threshold.

9. A method according to claim 8, wherein the threshold is equal to one of: 10 μm or 5 μm.

10. A method according to claim 8, wherein the distance between the first representation and the second representation is determined by means of a registration algorithm to identify a transformation for which one of the representations is the image of the other representation.

11. A method according to claim 8, wherein the first optical spectrum is situated in the visible spectrum, and/or the at least one second optical spectrum is situated in the infrared spectrum.

12. A method according to claim 8, wherein the image represents a portion of the body of a holder associated with the security device, and in which the method further comprises the steps of:

- acquiring an image of the portion of the body from a bearer of the security device;
- verifying that the acquired image corresponds biometrically with the first representation; and/or
- verifying that the acquired image corresponds biometrically with the second representation.

13. A method according to claim 8, wherein the security device is associated with digital storage means including a digital representation of the image, and in which the method further comprises the steps of:

- reading the digital representation of the image;
- verifying that the digital representation is substantially identical to the first representation; and/or
- verifying that the digital representation is substantially identical to the second representation.

14. A method according to claim 13, further comprising a step of:

- verifying that the acquired image corresponds biometrically with the digital representation.

15. A verification apparatus for verifying a security device that includes an image that has a signature, the verification apparatus comprising:

- a memory that includes instructions; and
- a computer, operably connected to the memory, that executes the instructions to perform operations comprising:
  - acquiring the image in a first optical spectrum in order to obtain a first representation;
  - extracting the signature; and
  - verifying the signature, wherein:

the signature is colorimetric and comprises a particular orientation of a color plate, or the signature is a frequency signature and the image includes at least one reference spatial period.

16. A non-transitory computer data medium that includes a computer program that, when executed by a computer, implements a method for verifying a security device that includes an image that has a signature, the method comprising:

acquiring the image in a first optical spectrum in order to obtain a first representation;

extracting the signature; and verifying the signature, wherein:

the signature is colorimetric and comprises a particular orientation of a color plate, or the signature is a frequency signature and the image includes at least one reference spatial period.

* * * * *